(12) United States Patent
Neumair

(10) Patent No.: US 6,237,624 B1
(45) Date of Patent: May 29, 2001

(54) SEAT VALVE

(75) Inventor: Georg Neumair, Thalhausen (DE)

(73) Assignee: Heilmeier & Weinlein Fabrik fur Oel-Hydraulik GmbH & Co., Munich (DE)

( * ) Notice: Subject to any disclaimer, the term of this patent is extended or adjusted under 35 U.S.C. 154(b) by 0 days.

(21) Appl. No.: 09/301,628

(22) Filed: Apr. 29, 1999

(30) Foreign Application Priority Data

May 7, 1998 (DE) ............................ 298 08 295 U

(51) Int. Cl.$^7$ .................................................. G05D 16/10
(52) U.S. Cl. ..................... 137/505.41; 137/554; 137/557
(58) Field of Search .................. 137/505, 505.41, 137/554, 557

(56) References Cited

U.S. PATENT DOCUMENTS 5,613,516 * 3/1997 Landrum .............................. 137/509

FOREIGN PATENT DOCUMENTS

| 41 08 080 | 9/1992 | (DE) . |
| 42 37 901 | 5/1994 | (DE) . |
| 296 15 498 U | 10/1996 | (DE) . |
| 63-089908 | 4/1988 | (JP) . |
| WO 87 01171 | 2/1987 | (WO) . |

* cited by examiner

Primary Examiner—Stephen M. Hepperle
(74) Attorney, Agent, or Firm—Cook, Alex, McFarron, Manzo, Cummings & Mehler, Ltd.

(57) ABSTRACT

A seat valve for regulating hydraulic pressure to an adjustable value comprises: a valve seat located between a first chamber having not regulated high pressure and a second chamber having said regulated pressure with said regulated value, a seat valve closure member movable in said first chamber in relation to said valve seat, and a control piston in said second chamber for engagement at said seat valve closure member, said control piston being located counter to the regulated pressure by an adjustable regulating force. Said control piston is coupled with a position detector in motion transmitting fashion. A signal can be generated by said position detector which signal has a predetermined and essentially constant proportion to the respective value of the regulated pressure within the entire adjustment range of the leakage-proof operating seat valve.

8 Claims, 3 Drawing Sheets

SEAT VALVE

Figure 1:
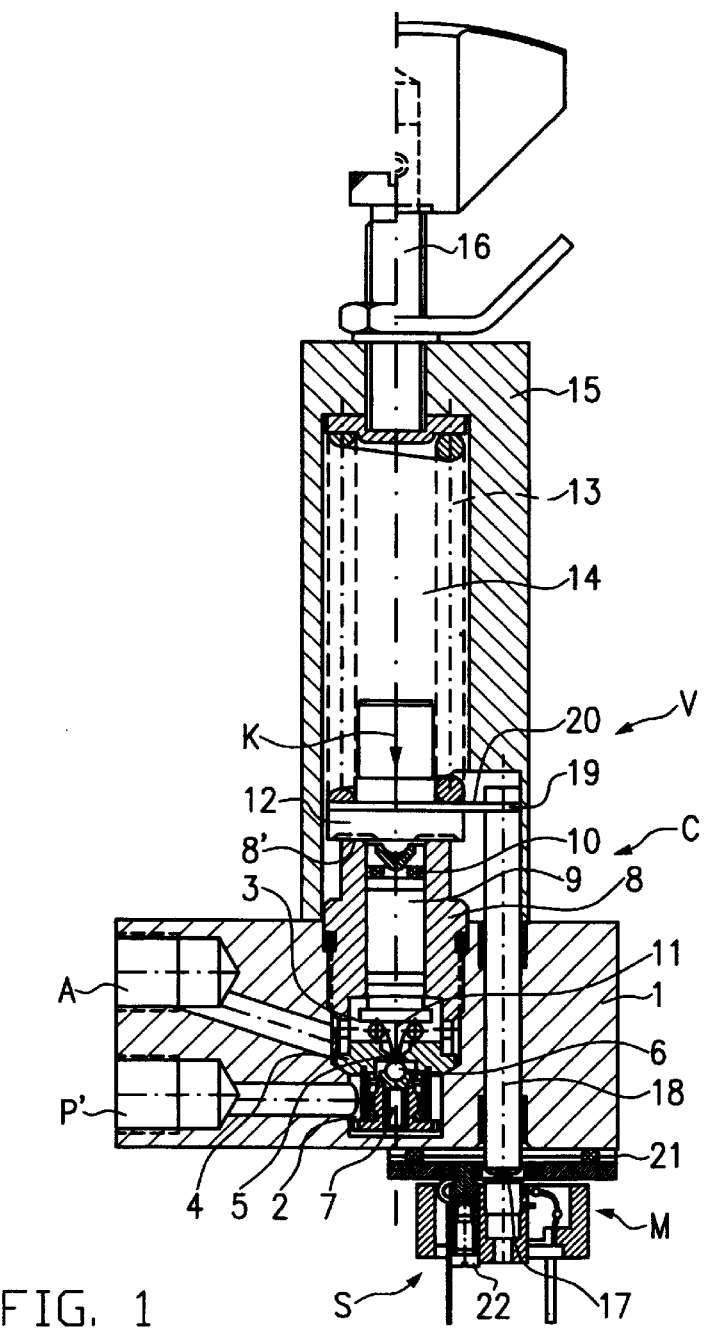

The present invention relates to a seat valve.

Pressure regulating- or pressure-reducing valves according to DE-A-296 15 498 allow carrying out a sensitive pressure regulation independent from pressure fluctuations of the unregulated pressure, since the control piston adjusting the closure member in relation to the valve seat exclusively is displaced by the regulated pressure counter to the regulating force, which force is determining the value of the pressure being regulated. The regulating force can be generated e.g. by a regulating spring, the spring load of which can be varied in order to vary the regulated pressure, or by means of a proportional solenoid acting as a magnetic spring and generating the respective regulating force depending on the current supplied. Such seat valves are used in high-pressure hydraulic applications if in addition to the pressure regulation the requirement of a leakage-free function has to be fulfilled, since seat valves in comparison to valves containing sliding closure members are reliably leakage-proof in their blocking position. A surveillance of the regulated pressure as needed in different application cases could generally e.g. be realized by means of a pressure switch directly exposed to the regulated pressure, the switching point of which pressure switch then has to be adjusted to the respective selected value of the regulated pressure. Since, however, any near adjustment of the regulating force is changing the value of the regulated pressure, then also the pressure switch would have to be readjusted accordingly. As a consequence, there is demand for a leakage-proof pressure regulating valve having a structurally simple pressure-surveillance function which does not need a readjustment in case of a variation of the regulating force.

In a pneumatic pressure reducing valve as known from JP 61235154/63089908 the opening movement of the piston-like valve closure member in relation to its valve seat is controlled by a diaphragm on which in opening direction of the valve an adjustable regulating spring and counter to the regulating spring the regulated pressure is acting. Movements of the diaphragm are transmitted to the valve closure member by a rod being coupled with the valve closure member. The top end of said rod is cooperating with a relief aperture in the diaphragm as a relief valve which is opened by said diaphragm in case of an unintended increase of the regulated pressure in order to readjust the regulated pressure to the pressure value as determined by the regulating spring. The lower end of said rod is cooperating contactlessly with a switch (proximity detector switch). A signal is generated as soon as the valve closure member is contacting the valve seat. Said signal is confirming that the regulated pressure has reached the adjusted value.

Further prior art is contained in WO 87 011871 and DE-A-1 08 080.

DE-A-42 37 901 discloses a pressure-reducing valve having an integrated pressure switch. Said pressure reducing-valve contains a control piston directly carrying out the pressure regulating function like a slider piston. With a control piston without seat valve function in operation and in the closed position, particularly in case of high system pressures, leakage, e.g. into the return system, cannot be avoided, so that such pressure reducing valves cannot be used in application cases where a leakage-free blocking position of the valve is needed.

In a pilot controlled pressure reducing valve as known from DE-A-32 04 455 the pilot valve contains a piston slider causing leakage which. Only in case of an emergency situation (breakage of the spring, failure of the solenoid), said piston slider is acting like a seat valve element and then actuates an electric switch depending on its emergency sliding stroke.

It is an object of the invention to provide a seat valve of the kind as disclosed apt to allow in a structurally simple fashion a reliable pressure surveillance which is uniform within the adjustment range of the seat valve and does not need to be readjusted in case of a variation of the regulating force.

Said object can be achieved by the following described features of.

In said seat valve comprising the control piston which is actuated by the regulated pressure counter to the regulating force, for the pressure surveillance the fact is used that the position of the control piston is representing the regulated pressure exactly and independent from the adjusted regulating force, as soon as the respective adjusted value of the regulated pressure is reached so that the position detector actuated by the control piston provides constantly a precise information to the regulated pressure within the entire adjustment range. Depending on the prior adjustment of the switching point of the position detector, said information confirms whether the adjusted value of the regulated pressure has been reached, or has been exceeded, or has not been reached or whether the pressure has dropped below said value. A reliable, readjustment-free pressure surveillance is achieved in combination with the advantage of the leakage-proofness of the valve function. Said combination is very advantageous for many application cases for which the leakage-proofness and a simple and reliable pressure surveillance are needed. It is not necessary to interfere for the pressure surveillance in the working flow path or to survey the position of the valve closure member, but the interference for the pressure surveillance is carried out at an optimum location at the control piston itself. However, it ought to be assured that the regulated pressure downstream of the seat valve cannot be raised by external influences.

In a structurally simple fashion in one embodiment an electrical switch is actuated by means of the control piston which switch e.g. is informing that the regulated pressure has been reached. A microswitch has the advantage of a very small actuation stroke and a precise switching point which can be adjusted exactly to the value of the regulated pressure or a pressure value which constantly is proportional to the regulated pressure, respectively. The position detector also can be constituted by a proximity switch, a Reed-switch or a capacatively operating switch. The position detector simply is provided in or at the housing in a pressureless zone, i.e. outside of the flow path, so that no complicated sealing measures are needed and the position detector does not need to be designed pressure safe.

In a further embodiment a correct guiding of the control piston is achieved together with the advantage of a reference position at an end stop. The position or the stroke, respectively, of the control piston is transmitted by a mechanical coupling towards the position detector. The position detector could instead also be provided directly at the control piston.

Expediently the regulating force either is generated by at least one regulating spring or by a proportional solenoid. Instead a Piezo-element or a step motor could be used.

In order to avoid disturbing forces when transmitting the regulating force onto the control piston said control position can be actuated by the regulating force via a regulating force counter support disc simultaneously serving as a drive element of the mechanical coupling for the position detector.

This is advantageous in terms of manufacturing, since among others the control piston does not need any modifications.

A compact structure can be achieved with a plunger actuating the position detector and being guided in its movement parallel to the movement of the control piston.

For the manufacturing it is useful to transmit, in both stroke directions and substantially without any lack, the movements of the control piston onto the plunger by means of the coupling element and the engagement part.

For easy manufacture the plunger can be guided simply in a housing bore leading towards the position detector. The adjustability of the position detector allows to precisely adjust the switching point.

In a further embodiment the position detector and the mechanical coupling are received by a housing part mounted on top of the housing. This is advantageous for mounting the seat valve, e.g. in a block arrangement.

In a further embodiment the regulating force counter support disc when transmitting the movement of the counter piston to the position detector is prevented against rotation. The switching point of the position detector can be adjusted directly at the plunger. This results in an enhanced response accuracy of the position detector and facilitates mounting thereof.

It as advantageous to adjust the switching point of the position detector not exactly to the value of the pressure which is to be regulated, but, e.g., to a slightly lower value. An adjusted difference, e.g., of about 10 bar, between the value of the regulated pressure and the switching point than will be maintained within the entire adjustment range of the seat valve or the regulating force, respectively, so that in case of a variation of the regulating force no adaptation of the position detector is needed, after the position detector once has been calibrated.

Figure 2:
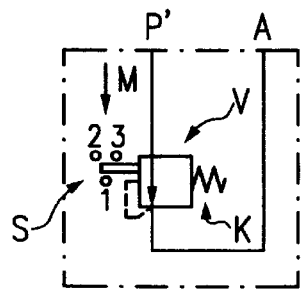
Figure 3:
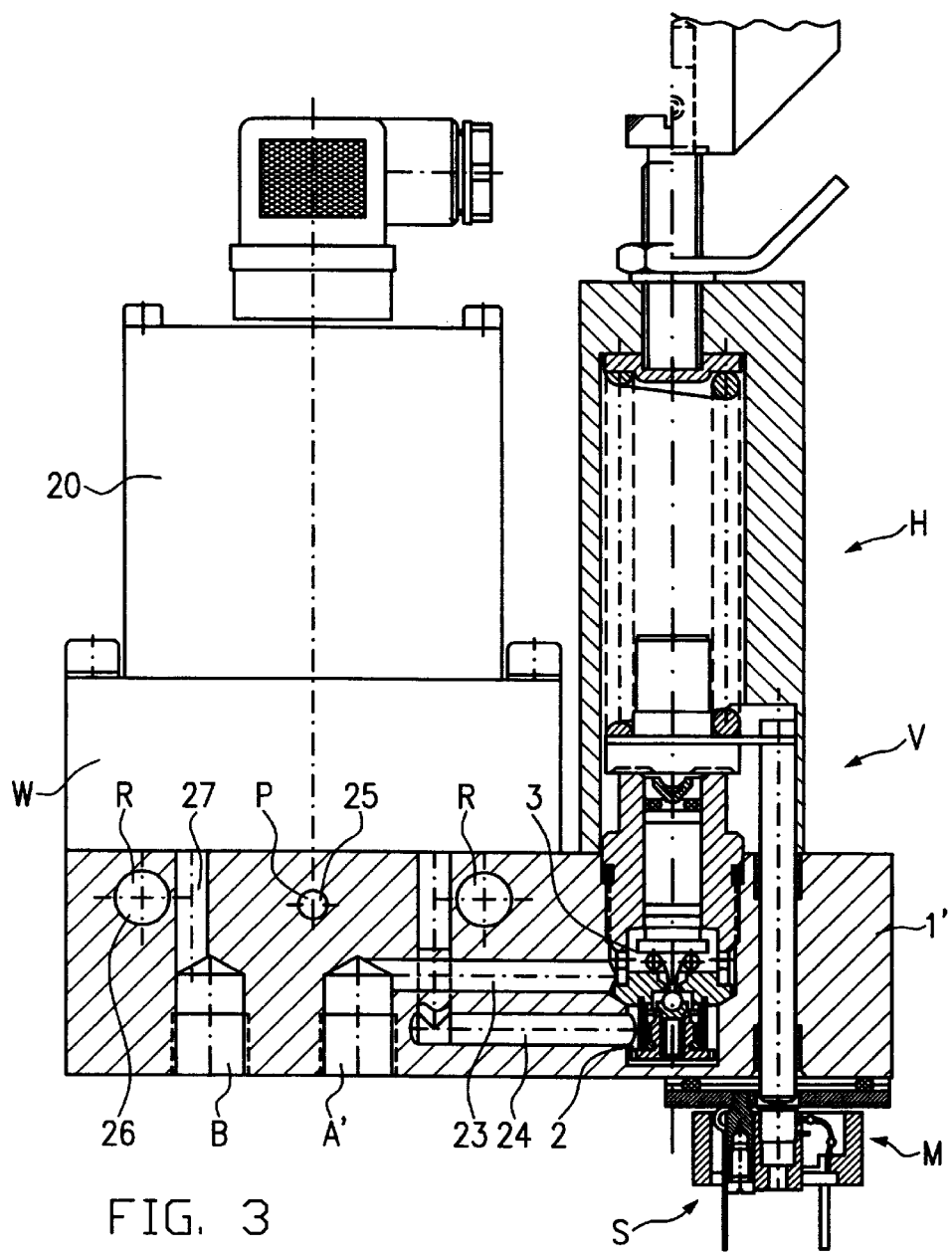
Figure 4:
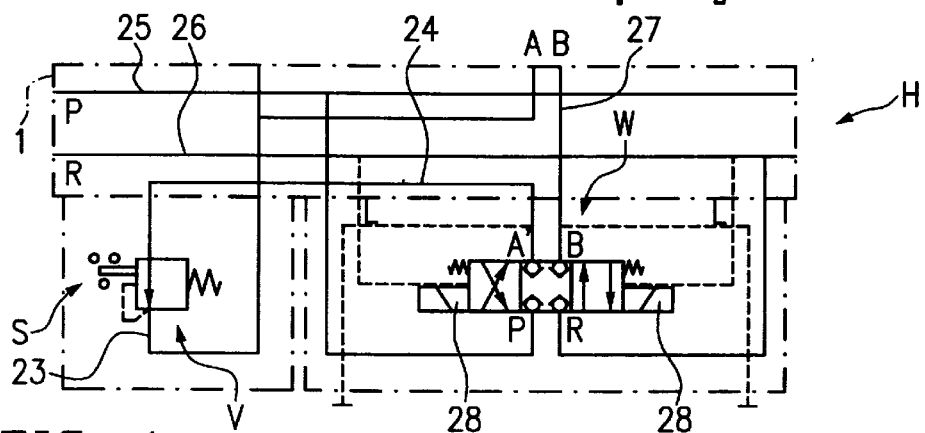
Figure 5:
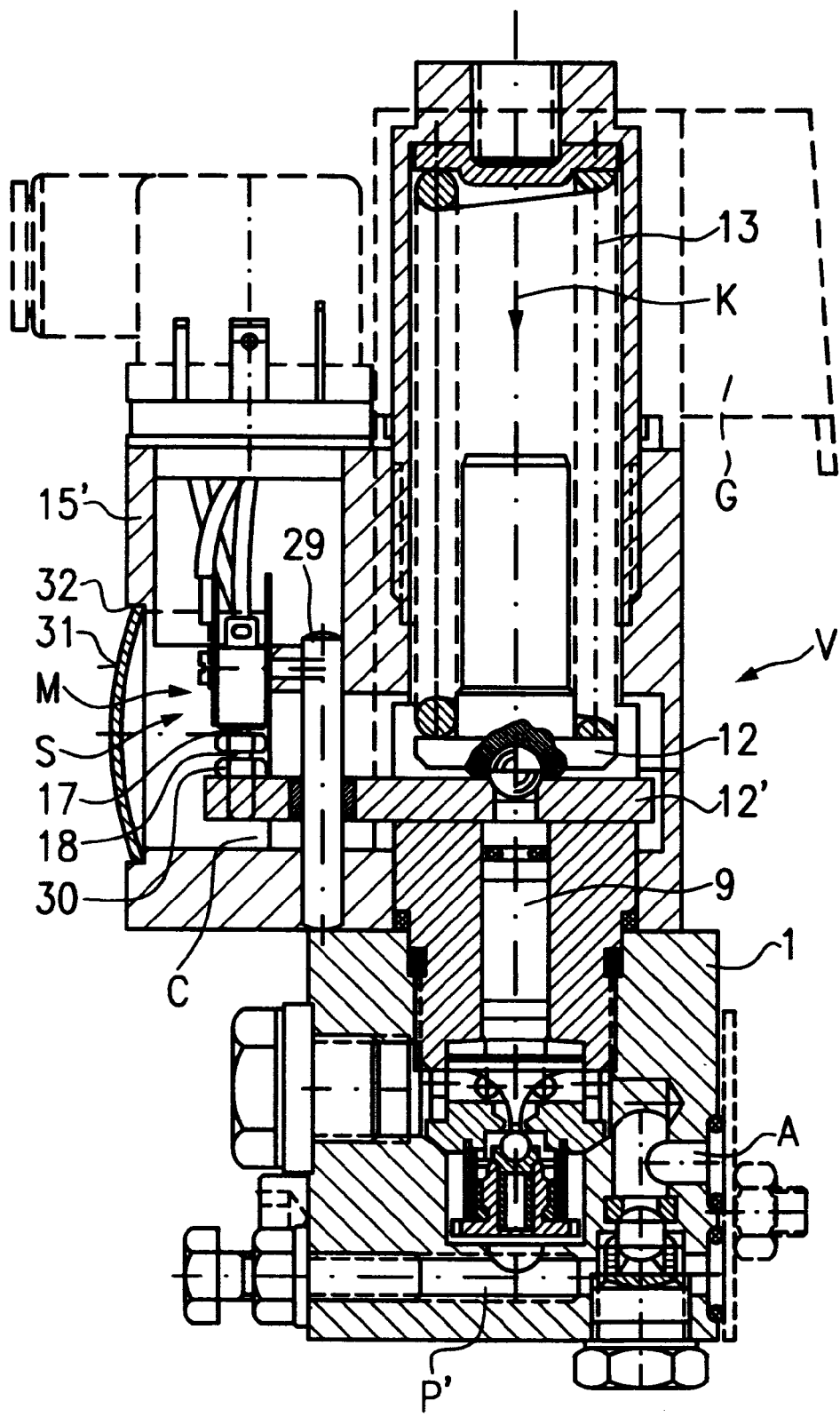

Embodiments of the invention will be described with the help of the accompanying drawings. In the drawings are:

FIG. 1 a longitudinal section of a seat valve having a pressure-surveillance function, FIG. 2 a block diagram associated to FIG. 1, FIG. 3 a partial longitudinal sect of a hydraulic control system into which a seat valve having a pressure surveillance function is incorporated, FIG. 4 a block diagram associated to FIG. 3, and FIG. 5 a longitudinal section of a further embodiment of the seat valve.

A seat valve V in FIGS. 1, 2 and 5 is intended to regulate the downstream pressure to a pressure value which can be varied within a given adjustment range, provided that the upstream, unregulated pressure, which may fluctuate, at least corresponds to the regulated pressure or is even higher.

The seat valve V comprises a first chamber 2 in a housing 1 which first chamber 2 is separated from a second chamber 3 by a valve-seat 5 provided in a housing insert 4. The first chamber 2 communicates with a port P' for the not regulated pressure, while the second chamber 3 communicates with a port A for the regulated pressure. A seat valve closure member 6 is associated to the valve seat 5 in first chamber 2, e.g. a bore, which can be moved up and down between the shown opening position and a blocking position in contact with valve seat 5, influenced by a guiding and damping assembly 7.

A sleeve 8 is inserted into the second chamber from the top side of the housing 1, advantageously is screwed in and sealed by a sealing. Said sleeve 8 slidingly guides in an inner bore a control piston 9. The actuation area of the control piston 9 is bigger than the cross sectional area of valve seat 5. The control piston 9 is sealed by at least one sealing 10 and can be shifted upwardly from the shown end position corresponding to the maximum opening stroke of closure member 6 by the regulated pressure in the second chamber 3. At the lower end of control piston 9 a protrusion 11 is formed passing the valve seat 5 with radial clearance and actuating the closure member 6. The top end of the sleeve 8 is defining a limit stop 8' for said maximum opening position of closure member 6. The control piston 9 is loaded with a regulating force K directed downwardly which in the shown embodiment is generated by at least one regulating spring 13. Said regulating force instead could be generated by a proportional solenoid. The regulating force K is transmitted by mean of a regulating force counter support disc 12, e.g. a spring regulating force counter support disc, onto control piston 9. The regulating spring 13 is received in a cavity 14 of a housing part 15 and acts with a preload which can be varied by means of an adjustment element 16 in order to vary the regulating force K and consequently the value of the regulated pressure in port A.

At the lower side of housing 1 a position detector M is mounted, e.g. an electrical switch, preferably a microswitch S, having an actuating element 17 pointing upwardly. Said actuating element 17 is in alignment with a housing bore in which a plunger 18 of a mechanical coupling C with the control piston 9 is guided parallel to the stroke direction of control piston 9. The plunger 18 is coupled with said counter fort 12 by means of a coupling part 20 clamped between said regulating spring 13 and said regulating force counter support disc 12. Said coupling part 20 engages into an engagement part 19, e.g. an annular groove, of the plunger 18.

The switching point of position detector M or switch S, respectively, is adjusted corresponding to the value of the regulated pressure or is adjusted to a pressure value which is slightly lower. Said adjustment can be carried out either by means of adjustment screw 22 and/or by means of spacer parts 21 between the position detector M and housing 1.

In the pressureless position as e.g. shown in FIG. 1 the actuation element 17 is pushed by plunger 18. The position detector M does not output a signal. With rising, not regulated pressure in port P' and due to the open valve seat 5, the pressure in the second chamber 3 and in port A rises and actuates the control piston 9 which starts to travel upwardly counter to the regulating force K. The closure member 6 follows said movement until it abuts at valve seat 5 and blocks leakage-free as soon as the regulated pressure has reached the value as adjusted by the regulating force K. The switching point of position detector M advantageously is adjusted so that the position detector outputs a signal if or slightly before the control piston has reached the position at which the adjusted value of the regulated pressure in port A is present, i.e., for example already at 90 bar for a value of 100 bar of the pressure which is to be regulated. If later, due to consumption, the regulated pressure in port A decreases, correspondingly the force acting on the control piston 9 upwardly is reduced until the regulating force K by means of protrusion 11 of control piston 9 starts to lift the closure member 6 counter to the unregulated pressure in port P' from valve seat 5 in order to allow to again reach the value of the regulated pressure. In case that the regulated pressure should drop too much preferably the position detector M responds and outputs a signal corresponding to an undue pressure drop.

According to FIG. 2 the seat valve V with switch S is used for surveying the pressure, i.e. to inform, whether the pressure adjusted for port A has been reached. The regulated pressure at port A is derived from the unregulated pressure at port P'.

The seat valve V is leakage-proof in its blocking position, since neither from chambers 2, 3 nor along control piston 9 hydraulic can medium be lost. If there is no consumption downstream seat valve V the regulated pressure will be maintained even over long resting periods.

In FIGS. 3 and 4 the seat valve V with its pressure surveillance by means of position detector M or switch S, respectively, is integrated in a hydraulic control system H. According to FIG. 4 said hydraulic control system H comprises a four/three-directional control valve W in seat valve-design (in its blocking position leakage-proof) which is connected with its port P to a pressure line 25 and with its port R to a return line 26. W serves to control the working directions of an e.g. dual-actuable hydro consumer (not shown) by means of working lines 24, 27. Said working lines 24, 27 are connected to ports A', B of the directional control valve W. Said valve is centered in its middle position (blocking position) by springs provided at both sides and is adjusted in the respected control position by means of one of two solenoids 28. In one control position port P is connected to port B, while simultaneously port A' is connected with port R. In the other control position port P is connected to port A' and port R is connected to port B. Via port A' the hydraulic consumer e.g. is brought to extent, while via port B the retraction stroke is controlled.

Seat valve including position detector M or switch S, respectively, is provided in working line 24 in order to regulate for the hydraulic consumer a predetermined pressure value corresponding to the regulating force K and on the basis of the unregulated pressure at port A' of the directional control valve. For this purpose a loop 23 of working line 24 and the seat valve V including the position detector M are received in a distributor block which is connected conventionally with the directional control valve W in a sandwich-structure fashion. Said distributor block is constituting housing 1' for the seat valve V and the position detector M.

FIG. 3 depicts the structural design of the control system H according to FIG. 4. The directional control valve W is mounted together with its solenoid 28 at the top surface of housing 1' such that its ports A', B are registered with lines 27 and 24 in housing 1' and that its ports R, P are communicating with lines 25, 26. Line 27 leads in housing 1' to port P. Line 24 leads in housing 1' into the first chamber 2 or seat valve V, while the second chamber 3 of seat valve V is connected with the line-loop 23.

The function corresponds to the one as described with reference to FIG. 1. As soon as the directional control valve W has switched into its control position in which its port P is connected to port A' in chamber 2 the unregulated pressure is prevailing. The seat valve V provides in line loop 23 the adjusted value of the regulated pressure. As soon as said value is achieved in the second chamber 3, or at a slightly lower pressure value, position detector M or switch S, respectively, responds and outputs a confirming signal. Said confirming signal remains active as long as the regulating pressure prevails at port A. Should the regulated pressure in port A drop below the predetermined value or below the selected, slightly lower value (the switching point of the position detector), then the confirmation signal ceases.

The hydraulic control system as shown in FIGS. 3 and 4 for example can be part of an electro-hydraulic spanning device of a machine tool at which the spanning pressure is adjusted by the regulated force K and wherein a superimposed control unit is informed via the position detector M or the switch S, respectively, whether the adjusted spanning pressure has been reached or not. In case that the spanning pressure is varied by varying the regulating force K, then the position detector M or the switch S, respectively, need not to be readjusted, since the variation of the regulating force does not have any influence on the position of the control piston 9 when the value of the regulated pressure is reached. Within the control system according to FIG. 4 alternatively the other working line 27 could be monitored by said seat valve V or could each of both working lines 24, 27 be monitored by such a seat valve, possibly even for different values of the regulated pressures.

Different from FIG. 1 in FIG. 5 the position detector M, e.g. an electrical microswitch S, is firmly mounted sidewards and aside of the regulating spring 13 generating the regulating force K within a cavity of housing part 15'. The mechanical coupling C, constituted by regulating force counter support disc 12' and plunger 18', is extending from control piston 9 sidewardly and upwardly to the exterior. The outer sides and lower sides of housing 1 are free offering advantages for mounting the structure. A pin 29 in housing part 15' forms a rotation securing means for regulating force counter support disc 12'. Plunger 18' is made as an adjustable screw 30 allowing to adjust the switching point of position detector M. For this purpose an easily removable cover 31 is provided within a window 32 of housing part 15'. Also in this embodiment instead of regulating spring 13 a proportional solenoid G (indicated in dotted lines) could be used in order to generate like a magnetic spring the regulating force K for control piston 9, which regulating force K can be adjusted depending on the current supplied. The operation of seat valve V corresponds to the operation as described above.

What is claimed is:

1. A pressure regulator with a position detector for regulating hydraulic pressure to an adjustable value, comprising a housing (1), a seat valve (5) between a first chamber (2) containing unregulated pressure (P') and a second chamber (3) containing regulated pressure (A) controlled by a regulated force (K), a seat valve closure member (6) movable in said first chamber from a seat valve (5) closing position to a seat valve opening position, a control piston (9) mounted for slidable movement in said second chamber (3) as influenced by said regulated pressure (A) of said chamber (3) and counter to said regulated pressure by said regulated force (K), said control piston being movable freely relative to said seat valve closure member and engageable with said seat valve closure member to open said seat valve, characterized in that said control piston (9) is coupled mechanically to a position detector (M) which generates a signal indicating that the regulated pressure has reached a selected proportion of the adjusted pressure in accordance with the position of said control piston (9) within the adjustment range of said seat valve which is sealed against leakage when said valve closure member is seated on said seat valve, said regulated force (K) applied to said control piston by a disc (12), said mechanical coupling (20) connected to said disc, said mechanical coupling including a plunger (18) displaceable parallel to the movement of said control system and being aligned with an actuating element (17) of said position detector, said position detector is adjustably mounted to an outer surface of said housing (1).

2. The pressure regulator with a position detector of claim 1 characterized in that said position detector is an electro-micro switch (S).

3. The pressure regulator with a position detector of claim 1 characterized in that said control position is provided in a sleeve (8) inserted in said second chamber, said sleeve extending into a pressure relief cavity (14) in which said regulating force is transmitted against said control piston.

4. The pressure regulator with a position detector of claim 1 characterized in that said regulating force originates from an adjustable regulating spring (13).

5. The pressure regulator with a position detector of claim 1 characterized in that said plunger has an engagement part into which a sidewardly extending coupling part (20) of said disc is engaged.

6. A pressure regulator with a position detector for regulating hydraulic pressure to an adjustable value, comprising a housing (1), a seat valve (5) between a first chamber (2) containing unregulated pressure (P') and a second chamber (3) containing regulated pressure (A) controlled by a regulated force (K), a seat valve closure member (6) movable in said first chamber from a seat valve (5) closing position to a seat valve opening position, a control piston (9) mounted for slidable movement in said second chamber (3) as influenced by said regulated pressure (A) of said chamber (3) and counter to said regulated pressure by said regulated force (K), said control piston being movable freely relative to said seat valve closure member and engageable with said seat valve closure member to open said seat valve, characterized in that said control piston (9) is coupled mechanically to a position detector (M) which generates a signal indicating that the regulated pressure has reached a selected proportion of the adjusted pressure in accordance with the position of said control piston (9) within the adjustment range of said seat valve which is sealed against leakage when said valve closure member is seated on said seat valve, said regulated force (K) applied to said control piston by a disc (12), said mechanical coupling (20) connected to said disc, said mechanical coupling including a plunger (18) displaceable parallel to the movement of said control system and being aligned with an actuating element (17) of said position detector, said position detector and said mechanical coupling are mounted in a housing part (15') provided on top of said housing, a regulating force disc connected to said control piston is guided in said housing by rotation-preventing safety means (29), said disc actuating said position detector via a plunger having an adjustment screw (22) to vary the active length of said plunger.

7. A pressure regulator with a position detector for regulating hydraulic pressure to an adjustable value, comprising a housing (1), a seat valve (5) between a first chamber (2) containing unregulated pressure (P") and a second chamber (3) containing regulated (A) controlled by a regulated force (K), a seat valve closure member (6) movable in said first chamber from a seat valve (5) closing position to a seat valve opening position, a control piston (9) mounted for slidable movement in said second chamber (3) as influenced by said regulated pressure (A) of said chamber (3) and counter to said regulated pressure by said regulated force (K), said control piston being movable freely relative to said seat valve closure member and engageable with said seat valve closure member to open said seat valve, characterized in that said control piston (9) is coupled mechanically to a position detector (M) which generates a signal indicating that the regulated pressure has reached a selected proportion of the adjusted pressure in accordance with the position of said control piston (9) within the adjustment range of said seat valve which is sealed against leakage when said valve closure member is seated on said seat valve, said regulated force (K) applied to said control piston by a disc (12), said mechanical coupling (20) connected to said disc, said mechanical coupling including a plunger (18) displaceable parallel to the movement of said control system and being aligned with an actuating element (17) of said position detector, said switching point of said position detector is adjustable in correspondence with said reference pressure deviated by a constant pressure differential relative to the value of said regulated pressure as adjusted by the magnitude of said regulating force.

8. A pressure regulator with a position detector for regulating hydraulic pressure to an adjustable value, comprising a housing (1), a seat valve (5) between a first chamber (2) containing unregulated pressure (P') and a second chamber (3) containing regulated pressure (A) controlled by a regulated force (K) originating from a proportional solenoid (G), a seat valve closure member (6) movable in said first chamber from a seat valve (5) closing position to a seat valve opening position, a control piston (9) mounted for slidable movement in said second chamber (3) as influenced by said regulated pressure (A) of said chamber (3) and counter to said regulated pressure by said regulated force (K), said control piston being movable freely relative to said seat valve closure member and engageable with said seat valve closure member to open said seat valve, characterized in that said control piston (9) is coupled mechanically to a position detector (M) which generates a signal indicating that the regulated pressure has reached a selected proportion of the adjusted pressure in accordance with the position of said control piston (9) within the adjustment range of said seat valve which is sealed against leakage when said valve closure member is seated on said seat valve, said regulated force (K) applied to said control piston by a disc (12), said mechanical coupling (20) connected to said disc, said mechanical coupling including a plunger (18) displaceable parallel to the movement of said control system and being aligned with an actuating element (17) of said position detector.

* * * * *